C. VOGEL.
ADJUSTABLE PITMAN.
APPLICATION FILED OCT. 24, 1908.
972,585.
Patented Oct. 11, 1910.
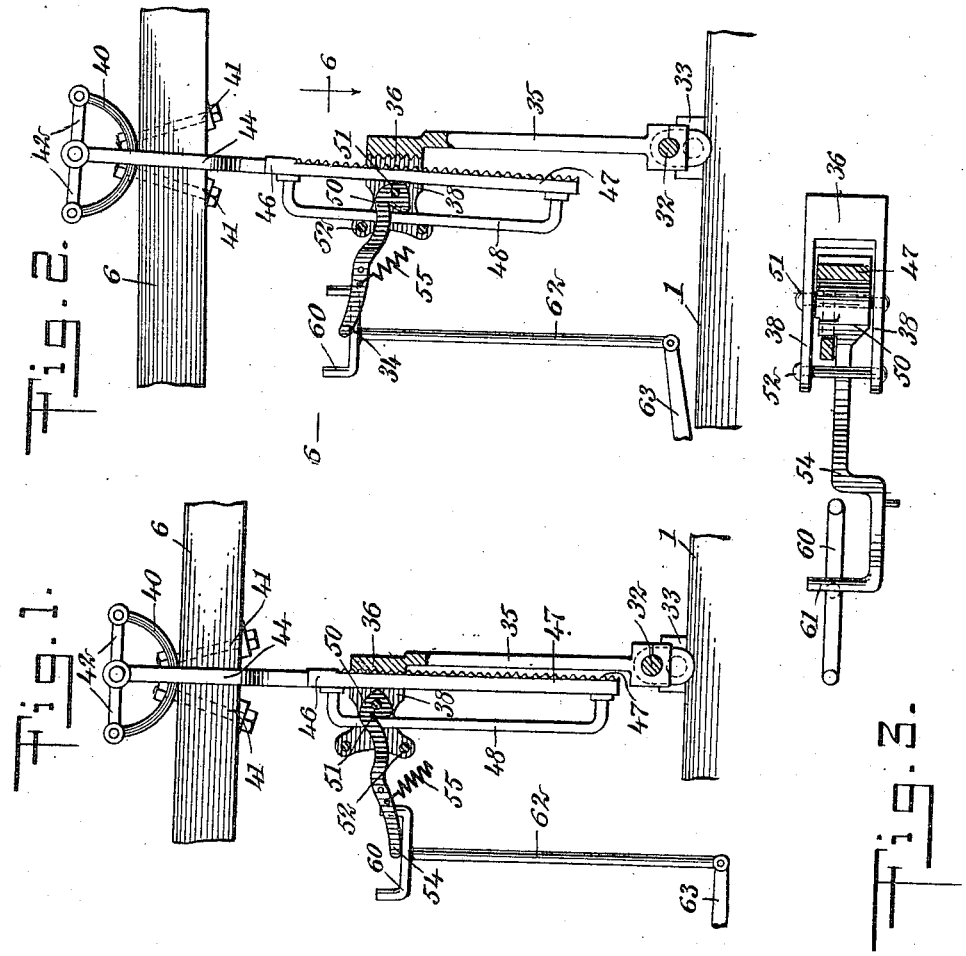
WITNESSES
INVENTOR
Christian Vogel
BY
ATTORNEYS

UNITED STATES PATENT OFFICE.

CHRISTIAN VOGEL, OF SEWARD, NEBRASKA.

ADJUSTABLE PITMAN.

972,585. Specification of Letters Patent. Patented Oct. 11, 1910.

Application filed October 24, 1908. Serial No. 459,278.

*To all whom it may concern:*

Be it known that I, CHRISTIAN VOGEL, a citizen of the United States, and a resident of Seward, in the county of Seward and State of Nebraska, have invented a new and Improved Adjustable Pitman, of which the following is a full, clear, and exact description.

This invention relates to an adjustable pitman, especially adapted for connecting the power beam of a forging hammer to the driving shaft, and consists in certain novel constructions and combinations of parts, hereinafter described and claimed.

Reference is to be had to the accompanying drawings forming a part of this specification, in which similar characters of reference indicate corresponding parts in all the figures.

Figure 1 is a partial detail view showing the adjusting means in clamping position; Fig. 2 is a similar view showing the adjusting means in open position and the power beam slightly raised; and Fig. 3 is a horizontal sectional view, taken on the line 3—3 in Fig. 2.

The embodiment of the invention shown in the drawings is designed to connect the beam 6 of the power hammer to a crank 32 on the driving shaft mounted in bearings 33 upon the upper side of the base 1 of the hammer.

In order to provide means for applying power to the beam 6, a crank shaft 32 is mounted in bearings 33, upon the upper side of the base 1. To the said crank shaft is connected a rod 35 having a rack 36 formed at its upper end. Said rod 35 is also provided with two laterally-extending wings 38. A yoke 40 is secured to the beam 6 by means of bolts 41, said yoke being a laminated spring, and to the upper ends of said spring are pivotally attached links 42, which in turn are pivotally attached to the upper end of a yoke 44, having its arms fastened down upon opposite sides of the beam 6, and united at their lower ends to form an extension 46 having a rack 47 on one side thereof.

A strap 48 is connected to the upper and lower ends of the extension 46 and coöperates with an eccentric cam lever 50 pivoted about a pin 51 mounted in the wings 38. The purpose of the eccentric cam lever 50 is to engage and disengage the rack 47 from the rack 36 to enable the driving connection between the crank-shaft 32 and the beam 6 to be adjusted. The backward movement of the strap 48 is limited by pins 52 mounted in the wings 38. The free end of the cam lever 50 is formed into an angular extension 54, to which is attached a spring 55, said spring being fastened at its lower end to a hook 56 mounted upon the crank shaft boxing. The spring 55 normally tends to keep the extension 54 in the position shown in Fig. 4, thereby forcing the eccentric portion of the cam lever against the rack 47, to clamp it against the rack 36.

In order to free the racks 36, 47 from each other, I provide a yoke 60 forming a support for the arm 61 of the extension 54 and mounted upon the upper end of a rod 62. The rod 62 is pivotally connected to the horizontal arm 63 of a bell crank (not shown) which may be operated in any suitable manner to raise the rod 62 to bring the cam lever 50 into the position shown in Fig. 2. When the adjustment is made, the arm 63 is released and the spring 55 forces the yoke 60 downward, and the eccentric portion of the cam lever 50 engages the rack 47 to clamp it against the rack 36 as shown in Fig. 2.

Having thus described my invention, I claim as new and desire to secure by Letters Patent:

1. In combination, a rod having at its upper end a rack and laterally extending wings, a yoke having an extension provided with rack teeth coöperating with the first named rack, a strap connected with the ends of the extension, a lever having a cam head pivoted between the wings, and between the strap and extension for forcing the teeth together, and having a handle extending beyond the strap.

2. In combination, a rod having at its upper end a rack and laterally extending wings, a yoke having an extension provided with rack teeth coöperating with the first named teeth, a strap connected with the ends of the extension, and means between the wings and between the strap and the extension for clamping the teeth on each other.

In testimony whereof I have signed my name to this specification in the presence of two subscribing witnesses.

CHRISTIAN VOGEL.

Witnesses:
  JOSEPH LAUDENBERGER,
  JNO. SUPPIGER.